United States Patent [19]
Mims et al.

[11] Patent Number: 5,344,188
[45] Date of Patent: Sep. 6, 1994

[54] VEHICLE SEAT BELT ANCHOR ARRANGEMENT

[75] Inventors: Mark W. Mims, White Lake; Frederick J. Zweng, Rochester Hills, both of Mich.

[73] Assignee: Chrysler Corporation, Highland Park, Mich.

[21] Appl. No.: 174,722

[22] Filed: Dec. 29, 1993

[51] Int. Cl.$^5$ ............................................... B60R 22/00
[52] U.S. Cl. ................... 280/808; 280/801.1
[58] Field of Search ............. 280/801 R, 808, 802; 297/468, 469, 486; 296/204

[56] References Cited

U.S. PATENT DOCUMENTS

| | | | |
|---|---|---|---|
| 4,220,353 | 9/1980 | Maskawa et al. | 280/801 R |
| 4,369,981 | 1/1983 | Chiba et al. | 280/501 R X |
| 4,506,911 | 3/1985 | Nakamura et al. | 280/801 R |
| 4,763,925 | 8/1988 | Owe et al. | 280/808 |
| 5,069,483 | 12/1991 | Hirasawa | 280/802 |
| 5,106,121 | 4/1992 | Boone | 280/807 |
| 5,207,453 | 5/1993 | Stedman et al. | 280/808 |
| 5,226,697 | 7/1993 | Borlinghaus et al. | 297/216 |
| 5,253,996 | 10/1993 | Verheski | 280/801 R X |

FOREIGN PATENT DOCUMENTS 0126743 8/1982 Japan ..................... 280/808

*Primary Examiner*—Karin L. Tyson
*Assistant Examiner*—Christopher P. Ellis
*Attorney, Agent, or Firm*—Edward P. Barthel

[57] ABSTRACT

A seat belt restraint anchorage member adapted for mounting to the underside of a vehicle floor pan enabling the belt load to be transferred by the member to the vehicle main frame. The anchorage member is fabricated from a one piece elongated sheet metal strip having, in cross sectional view, a leading end portion bent into a closed polygonal-shaped loop terminating in an elongated rearwardly extending blade portion. The loop is formed by a plurality of planar segments one of which is in flush attachment with an opposed upwardly contoured hump portion of the vehicle floor pan. The anchorage member is welded to the underside of the floor pan as a sub-assembly enabling the anchorage member and floor pan to be readily attached to the vehicle main frame at the assembly plant. Applicants' invention allows the seat belt loads to be conducted through the reinforcing anchorage member into an aft portion of the main frame thereby minimizing strain of the body shell.

6 Claims, 4 Drawing Sheets

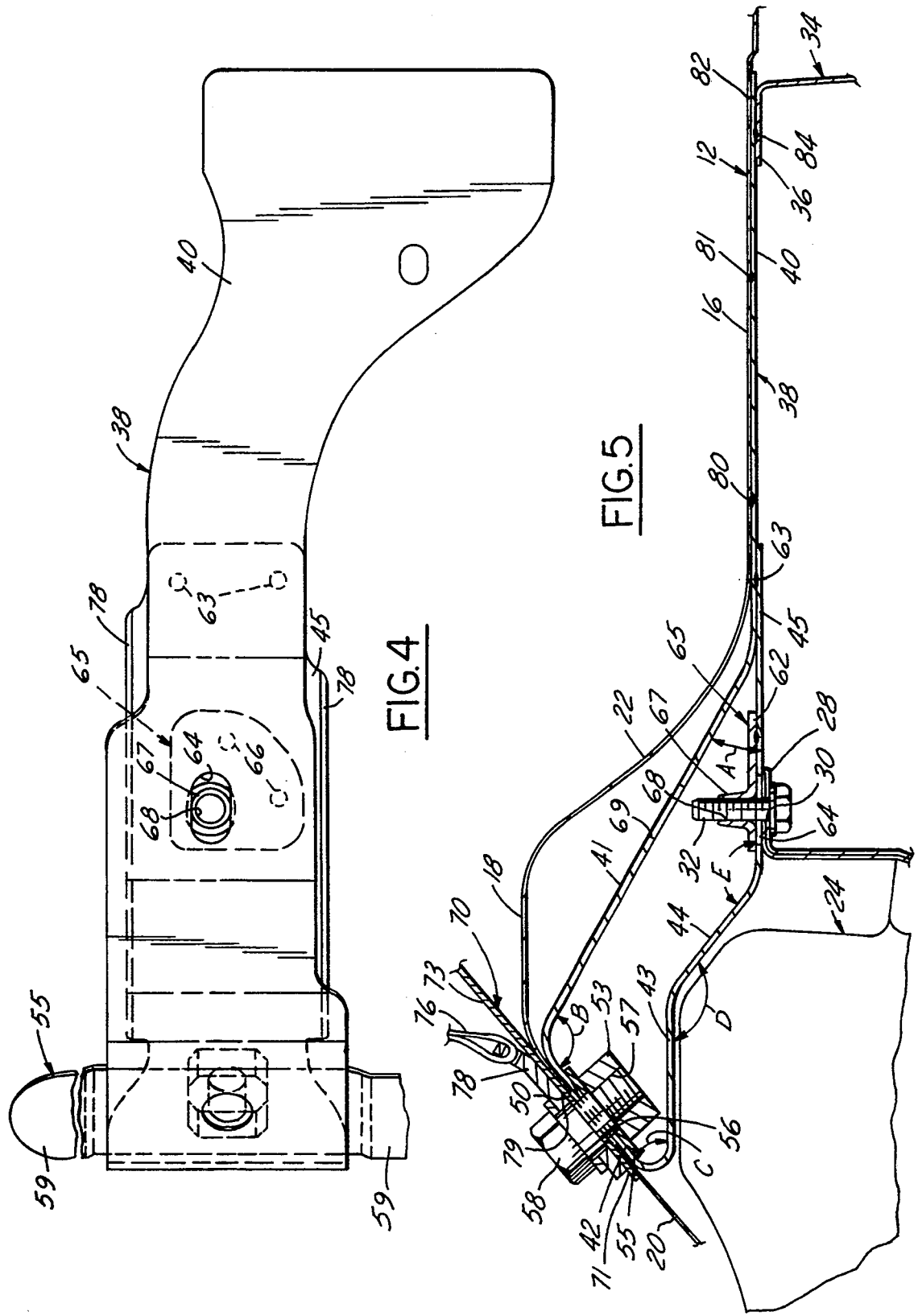

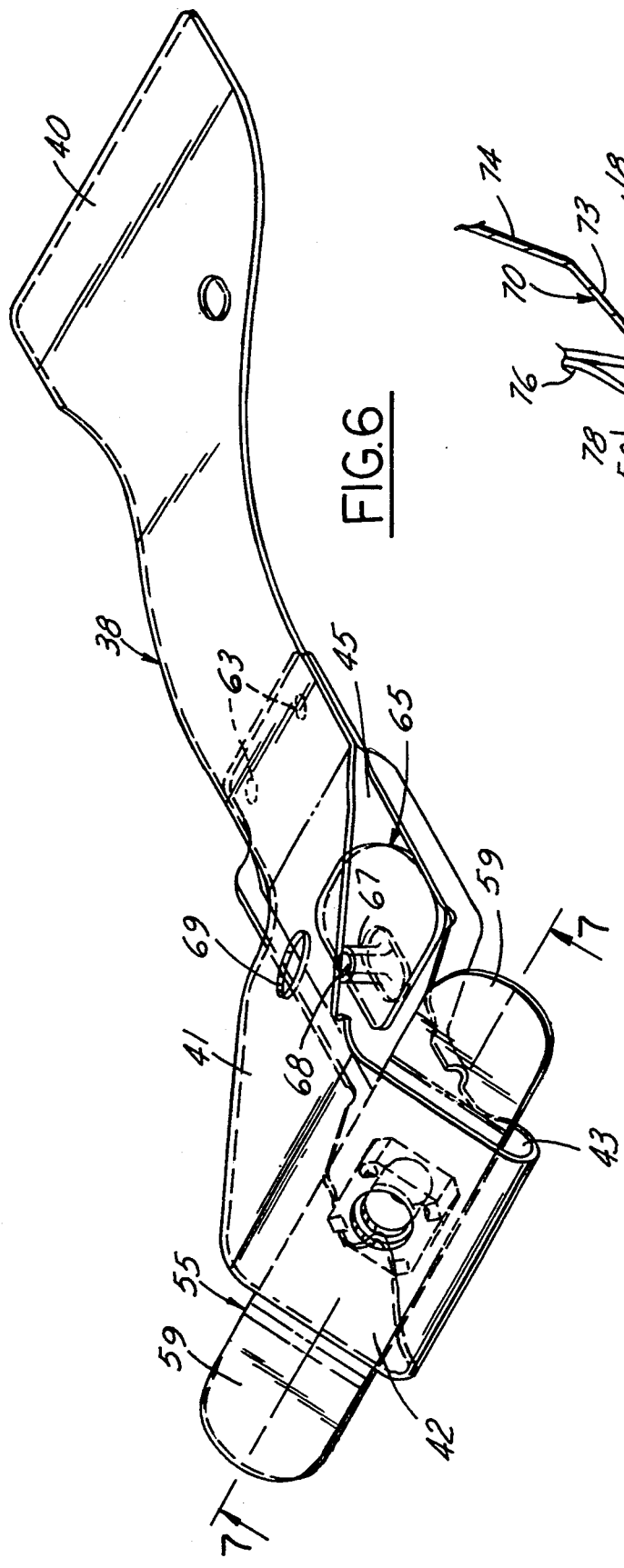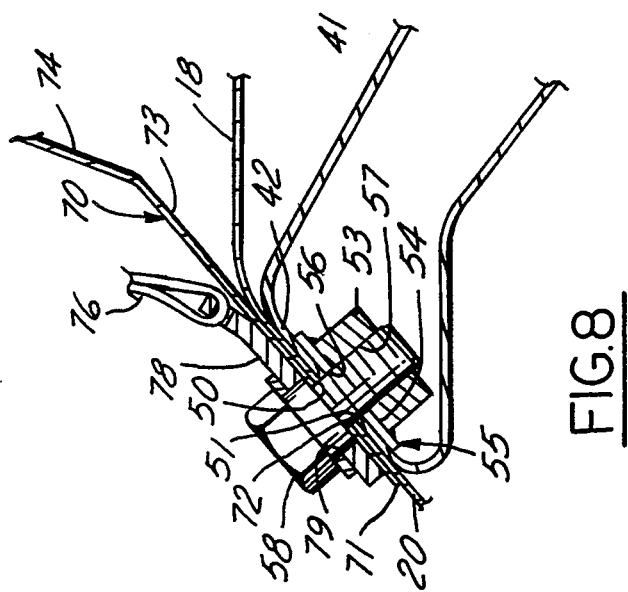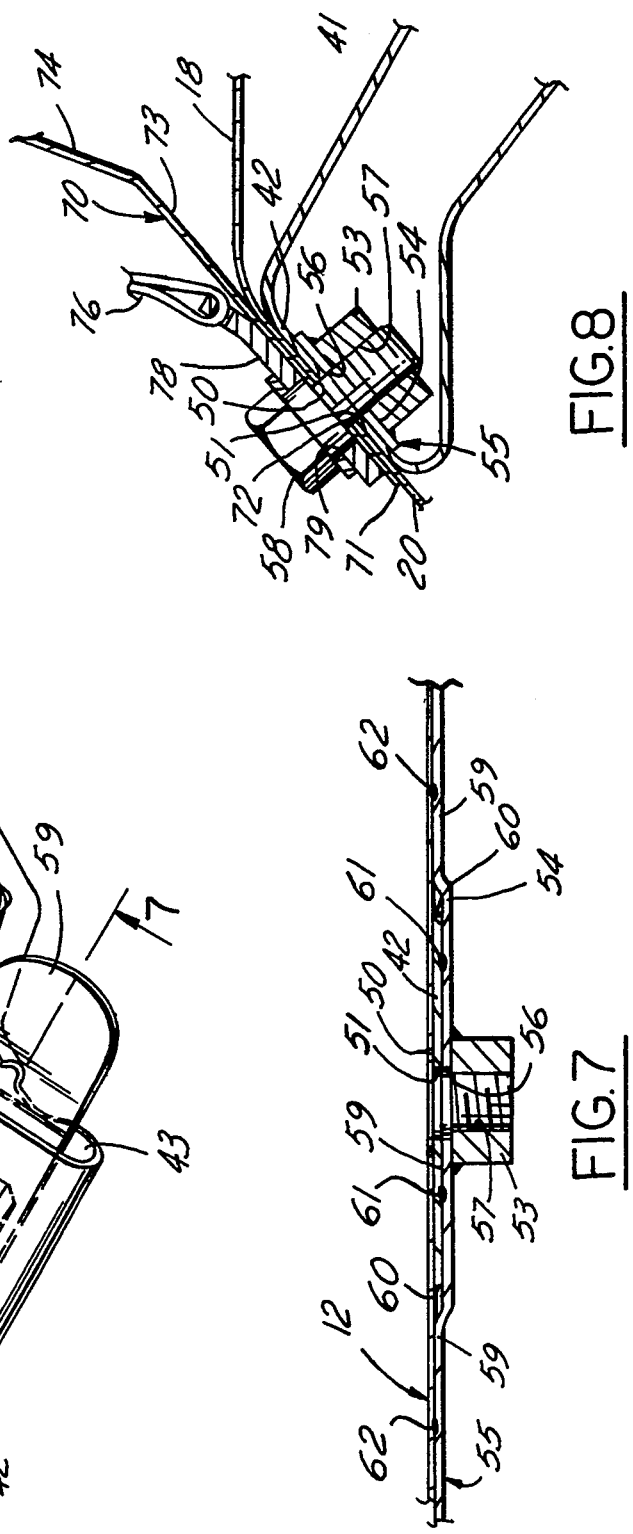

VEHICLE SEAT BELT ANCHOR ARRANGEMENT

BACKGROUND OF THE INVENTION

This invention relates generally to vehicle seats and, more particularly, to a seat belt anchor arrangement for transmitting seat belt loads to the vehicle body floor pan.

An example of one form of prior art seat belt anchor for a vehicle seat is shown in U.S. Pat. No. 5,226,697 issued Jul. 13, 1993 to Borlinghaus et al. The Borlinghaus patent provides a anchorage arrangement for a seat adjuster The U.S. Pat. No. 5,106,121 issued Apr. 21, 1992 to Boone entitled Occupant Restraint Belt Anchorage discloses an arrangement for securing a seat belt system for a seat structures adapted to be removably coupled to a vehicle floor.

The U.S. Pat. No. 5,207,453 issued May 4, 1993 to Stedman et al. entitled Add-on Structure For Vehicle Shoulder Belt discloses a belt anchoring arrangement for a convertible-type vehicle rear seat.

These and other prior art systems teach the desirability of transferring the belt load directly to the vehicle sheet metal floor pan adjacent the seat. In the case of a vehicle rear seat, it is desirable to transfer the belt load to the floor pan in a manner causing minimal deformation to the sheet metal. In the case of a vehicle rear seat structure positioned above a floor pan formed with a raised clearance hump, it is desirable to transfer the load, via an elongated anchorage member subjacent the floor, to a rearward frame member.

SUMMARY OF THE INVENTION

It is an object of the present invention to provide a restraint belt anchorage member for a vehicle seat structure whereby the member is adapted for attachment to the underside of a contoured portion of the floor pan enabling the transfer of belt loads to a vehicle subjacent frame aft of the seat structure while obviating distortion of the floor pan, reducing the weight and assembly time and labor cost.

It is still another object of the present invention to provide a restraint belt anchorage member for a vehicle seat structure wherein the anchorage member also provides a tapping plate attachment area for mounting a fuel tank or the like.

It is another object of the present invention to provide a restraint belt anchorage for a vehicle seat structure as set forth above which reduces the time, materials, and labor required to assembly the vehicle.

These and other features, objects, and advantages of the present invention will be readily apparent by reference to the following description of the preferred embodiment and appended drawings.

BRIEF DESCRIPTION OF THE DRAWINGS

FIG. 4 is an enlarged detail top view of the driver's side seat belt anchor strap assembly shown in FIG. 1;

FIG. 5 is a fragmentary vertical cross sectional view taken on the line 5—5 of FIG. 1;

FIG. 6 is an enlarged perspective view of the strap assembly of FIG. 4;

FIG. 7 is a fragmentary enlarged vertical sectional view taken on the line 7—7 of FIG. 6; and FIG. 8 is a fragmentary vertical sectional view taken on the line 8—8 of FIG. 3.

DETAILED DESCRIPTION OF THE INVENTION

Figure 1:
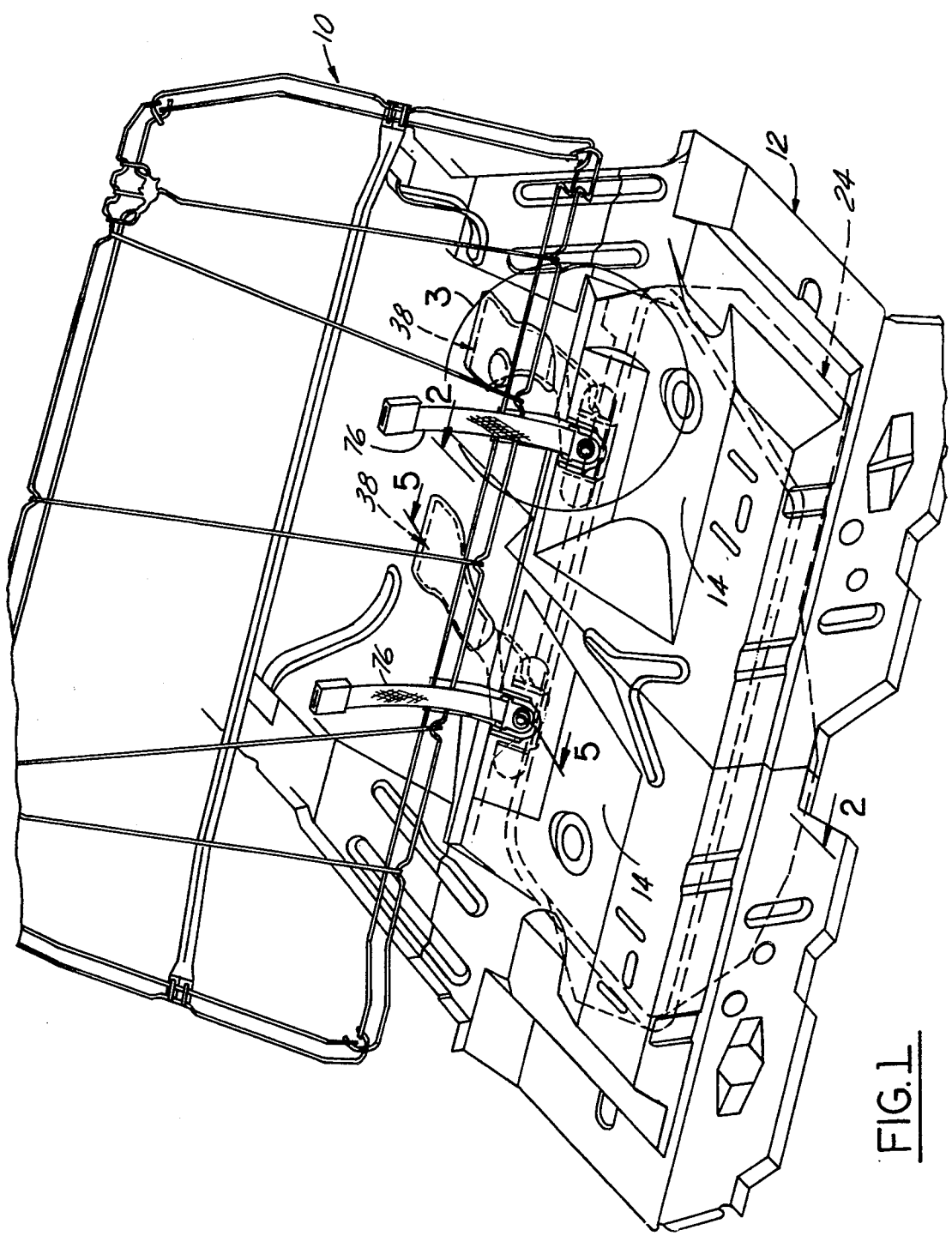
FIG. 1 is a fragmentary perspective view of a motor vehicle rear floor pan and seat frame structure fabricated in accordance with the present invention.
Figure 2:
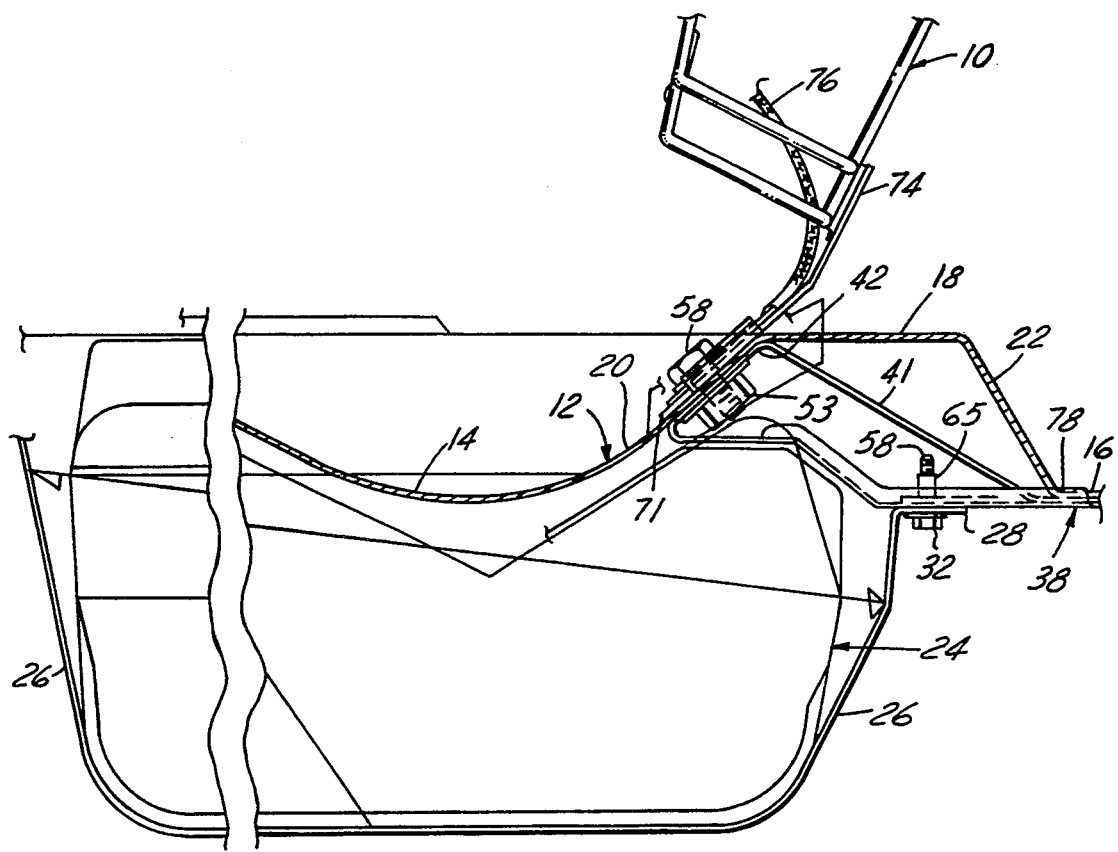
FIG. 2 is a fragmentary cross sectional view taken on the line 2—2 of FIG. 1.

Referring now to the drawings, and specifically to FIG. 1, there is shown a vehicle rear seat back free, generally indicated at 10, mounted on a vehicle body floor pan 12. A pair of downwardly contoured depressions 14 are provided for supporting a rear seat cushion (not shown). As best seen in FIG. 2, the rear seat depressions 14 are separated from a planar rear luggage floor panel portion 16 of the floor pan 12 by an upwardly contoured transversely extending hump. FIG. 5 shows the hump defined by a raised horizontal upper portion 18 having its leading terminus joined to forwardly sloped side portion 20 and a rearwardly sloped side portion 22.

With reference to FIG. 2, it will be seen that the floor pan seat depressions 14 and hub 18 overlie a vehicle fuel tank, generally indicated at 24. The fuel tank 24 is shown supported from the floor pan 12 by means of a plurality of fuel tank strap hangers, one of which being indicated at 26. Each tank hanger 26 has its forward end (not shown) suitably affixed to the floor pan 12 while its aft end is bent forming a right-angle tab 28. FIG. 5 shows the hanger tab 28 having a mounting hole 30 for the reception of a suitable threaded fastener bolt 32 enabling the fuel tank to be readily removed from the underside of the floor pan 12 in a manner to be explained. FIG. 5 also shows an upper portion of a vehicle main frame channel-shaped cross beam member 34 having an upper horizontal flange 36.

As best seen in FIG. 1, left and right side mirror image rear passenger restraint belt anchorage member, generally indicated at 38, is provided for each of the rear seat locations 14. FIGS. 4, 5 and 6 show the right hand anchorage member 38 preferably fabricated from a one-piece elongated blank of sheet steel. Upon being formed or bent the anchorage member has, in cross sectional view, an aft trailing blade 40 terminating at its forward end in a closed polygonal-shaped loop.

In the disclosed embodiment of the invention, anchorage member forward loop is formed by bending or stamping the sheet steel blank into five planar segments 41–45. The loop first segment 41 extends forwardly and upwardly at a predetermined angle from its juncture with the trailing blade portion 40. In the form shown, the first segment 41 defines an acute angle "A" of the order of thirty degrees (30 degrees) from the horizontal plane of the trailing blade 40.

The loop first segment 41 terminates in a forwardly and downwardly extending second segment 42 defining a predetermined internal obtuse angle "B" with the first segment 41. In the disclosed form, the internal angle "B" is an obtuse angle of the order of one hundred and ten degrees (110 degrees). It will be noted in FIG. 5 that the exterior surface of the second segment 42 is adapted for flush engagement with the undersurface of the floor pan forwardly sloped portion 20. An attachment hole 50 is provided in the floor pan hump forward side 20 which hole 50 is aligned with a hole 51 in the loop second segment 42 upon the anchorage member 38 being oriented in its FIG. 5 position.

As best seen in FIG. 7, a weld nut 53 is secured to exterior surface 54 of a transversely extending cross-strap, generally indicated at 55. The cross-strap 55 has a central hole 56 aligned with weld nut threaded bore 57 and with the second segment hole 51 for threaded reception of anchor bolt 58. It will be noted in FIG. 7 that the cross-strap 55 has a pair of offset side wing portions 59 protruding laterally beyond associated side edge 60 of the loop second segment 42. FIG. 7 shows the cross strap wing portions 59 secured to the second segment 42 by spot welds 61. Each cross strap wing portion 59 is secured by spot welds 62, to the floor pan underside. It will be appreciated that the cross-strap wing portions 59 provide weld areas which are easily accessible as by robot welding equipment or the like. Applicants' invention allows ready attachment of the anchorage member 38 to the floor pan undersurface prior to shipment of the floor pan sub-assembly to the vehicle assembly line.

The loop third segment 43 is shown extending rearwardly in a horizontal plane from the lower terminus of the second segment 42 defining a predetermined internal acute angle "C" therewith. In the instant embodiment the internal angle "C" is an acute angle of the order of forty five degrees (45 degrees) relative to the horizontal. The loop fourth segment 44 is inclined downwardly and rearwardly from the aft terminus of the third segment 43 defining a predetermined external obtuse angle "D" therewith. In the embodiment shown the external angle "D" is an obtuse angle of the order of one hundred and thirty five degrees (135 degrees).

The loop portion fifth segment 45 is shown extending rearwardly in a horizontal plane from the lower terminus of the fourth segment 44 defining a predetermined internal obtuse angle "E" therewith. In the form shown, the internal obtuse angle "E" is equal to the Angle "D"; i.e., the order of one hundred and thirty five degrees (135 degrees). With reference to FIG. 4, it will be noted that the free end of the fifth segment 45 is secured by spot welds 63 to the underside of the anchorage member trailing blade 40 thereby closing the anchorage member forward loop.

FIG. 5 shows the loop fifth segment 45, having a longitudinally extending slot 64 therein, providing a support area for a tapping plate, generally indicated at 65. The tapping plate 65 is secured to the inter surface of the segment 45 by spot welds 66 (FIG. 4). The tapping plate 65 is formed with an upstanding extrusion 67 having a threaded through bore 68 aligned with the fifth segment slot 64 and adapted to receive the bolt 32 for securing the fuel tank support hanger aft flange 28. It will be noted in FIGS. 4, 5 and 6 that the first loop segment 41 has an elongated bolt clearance slot 69 aligned with the tapped extrusion bore 68.

Figure 3:
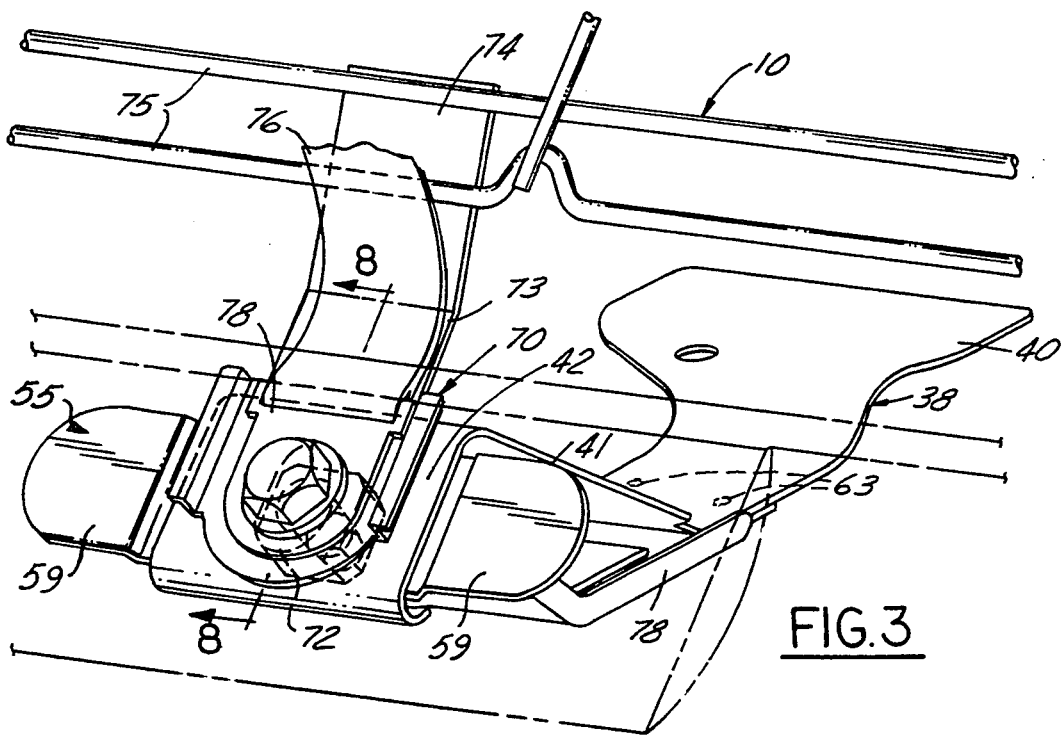
FIG. 3 is an enlarged view of a portion of FIG. 1 delineated by the dashed-line circle indicated at "3"

With reference to FIGS. 2, 3 and 8, it will be seen that the loop second segment 42 provides a sloped support for a seat back frame and restraint belt anchor bracket 70. The bracket 70 has a base 71, formed with a hole 72, adapted for flush mounting on the exterior surface of the floor pan hump forward side 20 with its base hole 72 aligned with the forward side hole 50. FIG. 2 shows the bracket base provided with an extension 73 terminating in an upwardly angled bracket flange 74 secured, as by welding, to laterally extending bars 75 of the seat back frame 10. A passenger restraint belt 76 has its metal tongue 78 provided with a hole 79 adapted for attachment by the bolt 58 to the bracket base 71.

As seen in FIG. 8, the bolt 58 is inserted through the metal tongue hole 79, aligned bracket base hole 72, floor pan hump forward side hole 50, loop second segment hole 51, and cross-strap hole 56 for threaded engagement in the weld nut bore 57 thereby anchoring both the belt 76 and the seat back frame 10. It will be appreciated that tension loads applied to restraint belt 76 and seat back bracket 70 are transferred, via the bolt 58, to the anchorage member second segment 42. Such tension loads are, in turn, transferred by the anchorage member first angled segment 41 and trailing horizontal blade segment 40 to the vehicle aft subjacent frame cross beam 34.

It will be noted in FIG. 4 that the anchorage member fourth 44 and fifth 45 sections each defining a channel cross-section wherein both sides thereof being formed with a co-extending upstanding edge flanges 78 to provide addition stiffness to the sections. As seen in FIG. 2, the edge flanges 78 are extend forwardly so as to continued along an aft side edge portion of section 43 to further stiffen the anchorage loop.

With reference to FIG. 5, it will be seen that the anchorage member trailing blade 40 is suitably secured to the underside of the floor pan, such as by a plurality of spot welds 80 and 81, prior to shipment to the vehicle assembly line. Thus, upon the assembled floor pan 12 and anchorage member 38 being placed on the vehicle subjacent frame an aft portion 82 of the anchorage member overlies the cross beam upper flange 36. Attachment of the anchorage member 38 to the vehicle main frame is readily achieved by suitable means such as by a plurality of spot welds 84.

While but one general embodiment of the present restraint belt anchor arrangement has been shown and described, other modifications thereof are possible within the scope of the following claims.

What is claimed is:

1. A seat restraint belt anchorage arrangement for a vehicle generally planar floor pan adapted for support on a subjacent body frame, said floor pan being formed with an upwardly contoured hump defined in part by a forwardly sloped planar floor pan side portion, and wherein the hump terminates in a rearwardly extending planar floor pan portion, said anchorage arrangement comprising:

an anchorage member adapted to be secured to the underside of the hump forwardly sloped side portion, said member fabricated from a one piece elongated sheet metal strip having, in cross sectional view, a forward closed loop and an elongated tailing blade;

said anchorage member loop formed by at least three planar segments in the form of an upwardly and forwardly extending angled first segment terminating at a forward end in a downwardly and forwardly bent second segment, said second segment terminating in a reverse bent rearwardly extending portion, and means securing an upper surface of said reverse bent portion in under-lapped relation to an opposed undersurface of said blade;

said loop second section having an exterior surface adapted for flush attachment with an underside of the hump forwardly sloped side portion, means securing an axially bored weld nut to an interior surface of said second segment, said nut bore aligned with an aperture in the hump side portion and said loop second segment;

whereby upon an occupant restraining belt anchor bracket being mounted on a complementary upper surface of the hump side portion, such that with a threaded fastener extending through said aperture means for threaded reception in said weld nut bore securing said second segment to the hump side portion and means for securing a distal end upper surface of said blade in a flush manner to an opposed underside of the floor pan said anchorage member providing, with the floor pan, a structural component adapted for transferring seat belt anchor bracket loads a predetermined longitudinal dimension rearwardly to the vehicle subjacent main frame.

2. The seat restraint belt anchorage arrangement as set forth in claim 1 wherein said weld nut securing means comprising a transversely extending cross-strap having one surface secured to an underside of said second section, said cross strap having side wings on either end thereof, each said side wing sized to extend a predetermined dimension from its associated side edge of said second section, each said side wing offset from the plane of the second section for flush contact with the floor pan hump forwardly sloped side portion, whereby the cross strap wings are adapted to be welded to the floor pan hump forwardly sloped side portion.

3. The seat restraint belt anchorage arrangement as set forth in claim 1 wherein said reverse bent rearwardly extending portion defining a horizontally disposed segment fixedly supporting a tapping plate on an upper surface thereof, said tapping plate having an upstanding extrusion provided with a thorough-bore adapted for receiving a fastener enabling a vehicle component to be secured to an underside of the vehicle floor pan.

4. The seat restraint belt anchorage arrangement as set forth in claim 1 wherein said rearwardly extending portion comprising a horizontally disposed third segment, a rearwardly and downwardly inclined fourth segment, terminating in a fifth horizontally disposed segment in under-lapping relation to an opposed undersurface of said blade portion and secured thereto by welding.

5. The seat restraint belt anchorage arrangement as set forth in claim 4 wherein said fifth segment supporting a tapping plate on an upper surface thereof, said tapping plate having an upstanding cylindrical extrusion provided with a threaded through-bore adapted for receiving a threaded fastener enabling a vehicle fuel tank to be secured to an underside of the vehicle floor pan.

6. The seat restraint belt anchorage arrangement as set forth in claim 4 wherein the loop fourth and fifth segments are upwardly opening channel sections.

* * * * *